3,137,069
SHEARS
James Thomas Vosbikian, 20th and Oxford Sts., Philadelphia, Pa.
Filed Dec. 14, 1962, Ser. No. 244,808
3 Claims. (Cl. 30—248)

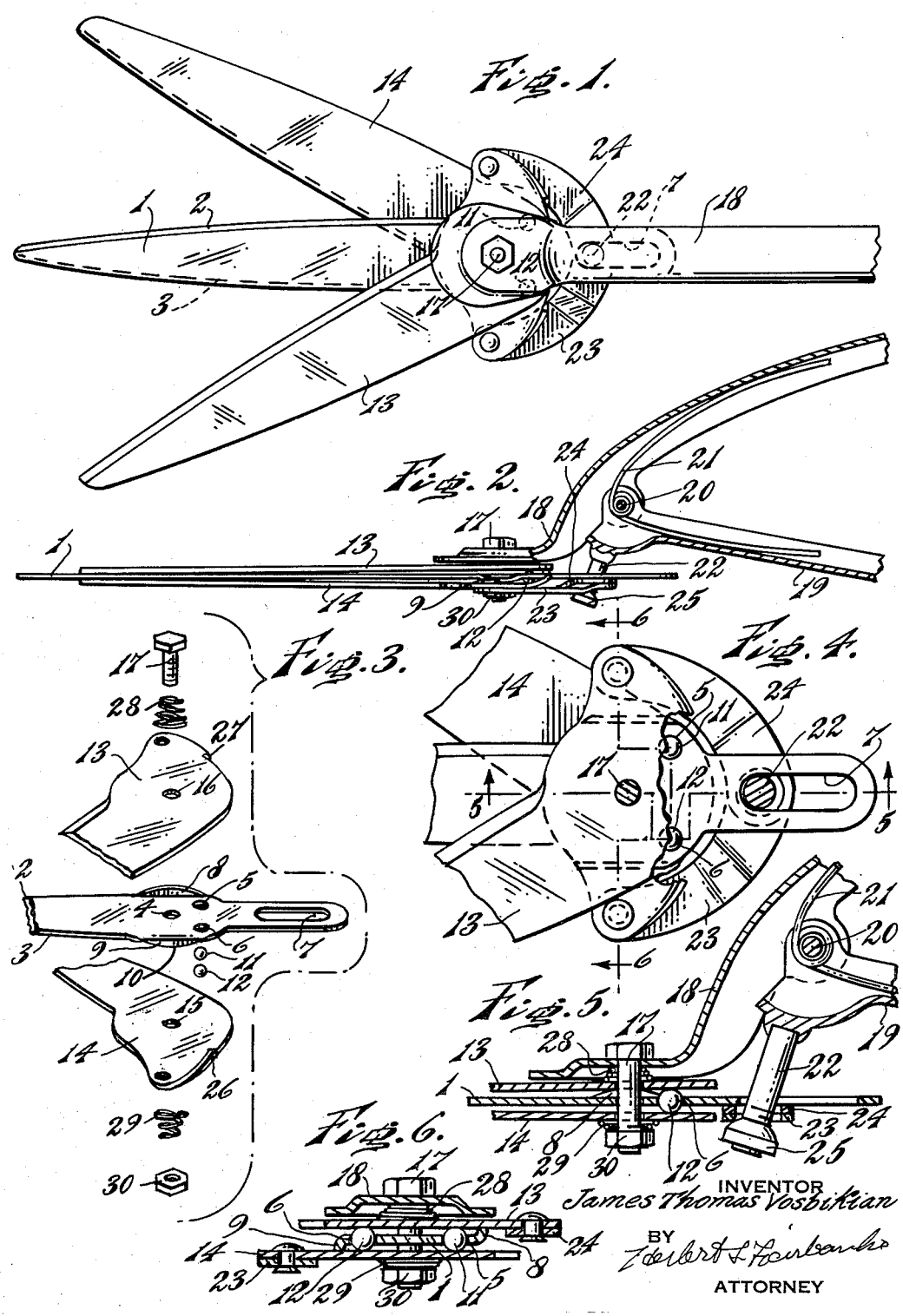

The object of this invention is to devise a novel construction and arrangement of the component parts of shears which will provide a better and more efficient cutting action and the elimination of friction between the blades. While more particularly designed for the cutting and trimming of grass at the border of a lawn, they may be used for cutting any desired material.

A further object of the invention is to devise a novel center blade, having cutting edges at opposite sides, having in rear of the pivotal points of the blades, openings through which balls extend to bear against a top and a bottom blade, and the rear portion of the central blade being provided with a longitudinal slot to receive a linkage connection having a pivot member connected with a movable handle and extending through said slot to limit both the opening and closing movement of the blades.

A further object of the invention is to provide the center blade with upwardly and downwardly deflected portions which prevent twisting of the center blade.

A further object is to provide novel tensioning means for the blades at the pivotal points of the blades.

With the foregoing and other objects in view as will hereinafter clearly appear, my invention comprehends a novel shears.

It further comprehends a novel construction and arrangement of shears having the features of advantage as herein set forth.

For the purpose of illustrating the invention, I have shown in the accompanying drawings a preferred embodiment of it, which I have found in practice, to give reliable and satisfactory results. It is, however, to be understood that the various instrumentalities of which the invention consists can be variously arranged and organized, and I therefore, do not desire to be limited, except by the scope of the appended claims, to the exact arrangement and organization of these instrumentalities as herein set forth.

FIGURE 1 is a top plan view of shears embodying my invention.

FIGURE 2 is a side elevation, with the handle portion in section.

FIGURE 3 is an exploded perspective view of the central portion of the blades with certain of their component parts.

FIGURE 4 is a top plan view, on an enlarged scale, of the central portion of the blades, partly broken away, and with the handle portion removed.

FIGURE 5 is a jump section on the line 5—5 of FIGURE 4.

FIGURE 6 is a jump section on the line 6—6 of FIGURE 4.

Similar numerals of reference indicate corresponding parts.

Referring to the drawings:

The central, stationary blade 1, has at opposite sides cutting edges 2 and 3, having a pivot receiving opening 4 and in rear of such opening, at opposite sides of the longitudinal plane of the blade, ball receiving openings 5 and 6 are provided. The rearwardly extending portion of the blade is provided with a slot 7. At opposite sides of the pivot hole 4, the blade has upwardly and downwardly reflected portions 8 and 9, and rounded as at 10.

The openings 5 and 6 in the central blade 1, receive balls 11 and 12, which extend above and below the blade.

Top blade 13 and bottom blade 14 have pivot openings 15 and 16 adapted to receive pivot bolt 17, which passes through a flattened portion of the stationary handle 18, which is pivotally connected with a movable handle 19 with a pivot pin 20, the handles 18 and 19 being also provided with a spring 21. A pivot pin 22 is fixed to the lower portion of the movable handle 19 and is adapted to receive links 23 and 24 which are pivoted at their opposite ends with extended portions of the top blade 13 and bottom blade 14. The links 23 and 24 are held in adjusted position on the pivot pin 22 by a nut 25. The rearwardly extended portion of the bottom blade is upwardly extended as at 26 to form a stop portion and in like manner the top blade is provided with a downwardly extended portion 27, which limit the extent of closing movement of the blades. Conical spring 28 is interposed between the flattened portion of the handle 18 and the top blade, and being mounted on pivot bolt 17. In similar manner, a conical spring 29 is interposed between the bottom blade and fastening nut 30.

The operation will now be apparent and is as follows:

When the lower handle is raised, the top and bottom blades move over the center blade to effect a dual cutting operation. The pivotal connection of the links with the lower handle, which extends through the longitudinal slot in the center blade, and limits the opening movement of the blades and the closing movement of the blades, is limited by the deflected portion of the top and bottom blades contacting the rearwardly extending portion of the center blade, and the longitudinal slot, depending on its length, may limit the closing movement of the blades.

The balls extending through openings in the center blade, in rear of the pivot bolt, contact the upper and lower blades to form a ball bearing connection between the blades and eliminate the friction normally present.

The amount of tilt or rocking movement of the upper and lower blades, relatively to the center blade, is controlled by the diameter of the balls.

The top and bottom blades really turn on the conical springs which form the tensioning means for the blades.

Having thus described my invention, what I claim as new and desire to secure by Letters Patent is:

1. Shears, comprising a central blade having cutting edges at opposite sides, and having ball receiving openings at its rear portion, balls in said openings, a top blade and a bottom blade contacted by said balls, a stationary handle, a pivot bolt extending through said blades and handle, a movable handle pivoted to said stationary handle, means on the bolt to tension said blades, and links pivotally connected to offset portions of the top and bottom blades and to said movable handle.

2. The construction defined in claim 1, wherein the central blade has a longitudinal slot at its rear portion and the pivoted connection of the links with the movable handle extends through said slot.

3. The construction defined in claim 2, wherein the length of the slot in the central blade limits the opening movement of the top and bottom blades.

References Cited in the file of this patent

UNITED STATES PATENTS

| 1,584,459 | Link | May 11, 1926 |
| 1,885,754 | Nachtigall | Nov. 1, 1932 |
| 3,039,192 | Vosbikian et al. | June 19, 1962 |